United States Patent [19]
Matsunaga et al.

[11] Patent Number: 5,508,987
[45] Date of Patent: Apr. 16, 1996

[54] DISK PLAYER HAVING A SYSTEM CONFIGURATION FOR DETERMINING THE DIAMETER OF LOADED DISKS

[75] Inventors: Masanori Matsunaga, Chofu; Kouichi Takeno, Sagamihara; Takehiro Kataoka, Atsugi, all of Japan

[73] Assignee: Mitsumi Electric Co., Ltd., Tokyo, Japan

[21] Appl. No.: 286,401

[22] Filed: Aug. 5, 1994

Related U.S. Application Data

[63] Continuation of Ser. No. 96,069, Jul. 22, 1993, abandoned.

[30] Foreign Application Priority Data

Jul. 24, 1992 [JP] Japan ................. 4-052315 U

[51] Int. Cl.⁶ ................................................ G11B 27/36
[52] U.S. Cl. .................... 369/58; 369/44.27; 369/50; 369/190
[58] Field of Search .................. 369/54, 58, 44.27, 369/44.26, 50, 190, 267, 268; 360/73.03, 74.5

[56] References Cited

U.S. PATENT DOCUMENTS

| | | | |
|---|---|---|---|
| 4,653,040 | 3/1987 | Senso | 369/190 X |
| 4,819,221 | 4/1989 | Overath et al. | 369/50 |
| 5,054,014 | 10/1991 | Ito et al. | 369/190 |

FOREIGN PATENT DOCUMENTS 2113848  9/1990  Japan.

*Primary Examiner*—W. R. Young
*Attorney, Agent, or Firm*—Whitham, Curtis, Whitman & McGinn

[57] ABSTRACT

An object of this invention is to provide a disk player in which a plurality of disks different in diameter are driven, and can be identified with high accuracy. Disclosed is the disk player, a digital signal processing section applies to a CPU a synchronization signal which is raised to high level when the frequency of a detection signal outputted by a laser pickup reaches a predetermined value which permits a data reading operation, and a sense signal which is raised to high level when the frequency of the detection signal is shifted from a predetermined frequency. The CPU operates to rotate a spindle motor, and to brake the latter when the synchronization signal is raised to high level. The CPU further operates to detect a period of time which lapses from the time instant the motor is braked until the sense signal is fallen to low level, and to identify the loaded disk from the period of time thus detected.

6 Claims, 6 Drawing Sheets

DISK PLAYER HAVING A SYSTEM CONFIGURATION FOR DETERMINING THE DIAMETER OF LOADED DISKS

This is a continuation of application Ser. No. 08/096,069 filed Jul. 22, 1993, now abandoned.

BACKGROUND OF THE INVENTION

1. Field of the Invention

This invention relates to signal reproducing devices for record disks, more particularly to a signal reproducing device for record disks (hereinafter referred to as "a disk player", when applicable) which is able to drive a plurality of kinds of disks different in diameter.

RELATED ART

A recent disk player for compact disks (CD) (hereinafter referred to as "a compact disk player", when applicable) is so designed as to be able to reproduce signals from two kinds of compact disks 12 cm and 8 cm in diameter (hereinafter referred to as "a 12 cm compact disk" and "an 8 cm compact disk", respectively, when applicable).

FIG. 5 is a block diagram showing the arrangement of a compact disk player. In FIG. 5, reference numeral 11 designates a compact disk which is rotated by a spindle motor 12. The motor 12 is driven in response to a drive signal from a driver 13, which is controlled in a CLV (constant linear velocity) mode by a servo control section 14.

The servo control section 14 is connected to a head amplifier section 15, a CPU (central processing unit) 16, and a digital signal processing section. The servo control section 14 servo-controls the spindle motor 12 according to data recorded on the disk 11 which is detected by a laser pickup 18, data provided by the digital signal processing section 17, and instructions from the CPU 16.

An 8 cm compact disk and a 12 cm compact disk are different in diameter. Therefore, those two kinds of compact disks are different in inertia when rotated or braked. Hence, whenever any one of the two kinds of compact disks is loaded to be played, the drive control gain of the spindle motor 12 is changed for the compact disk thus loaded. A conventional operation of discriminating the two kinds of compact disks will be described with reference to FIG. 6.

When the compact disk 11 is replaced, the CPU 16 operates to start the motor 12, and detects a period of time which lapses from the time of start of the motor 12 until the frequency of a detection signal detected by the laser pickup 18 reaches a predetermined value which permits the reading of data from the disk 11 (Steps S1-1 through S1-3).

When the period of time thus detected is shorter than a reference value, the CPU 16 determines that the compact disk loaded is an 8 cm compact disk smaller in inertia (Step S1-4). When, on the other hand, it is longer than the reference value, the CPU 16 determines that the compact disk loaded is a 12 cm compact disk larger in inertia (Step S1-5).

When the compact disk loaded is identified in the above-described manner, the CPU 16 applies a gain control signal to the servo control section 14. In response to the gain control signal, the latter 14 operates to change the control gain of the motor 12 to a value which is suitable for the compact disk thus identified.

As was described above, in the conventional disk player, the period of time which lapses from the start of the motor 12 until the synchronization of the disk is detected to determine whether the disk is a 12 cm compact disk or an 8 cm compact disk. That is, the synchronization signal is detected before the rotation of the disk is stabilized. Hence, it is impossible to accurately identify the compact disk loaded.

SUMMARY OF THE INVENTION

In view of the foregoing, an object of this invention is to provide a disk player which is able to accurately identify the disk loaded therein.

According to an aspect of the present invention, a disk player comprises disk driving means for driving a disk; detecting means for reading a data signal from said disk; synchronization detecting means for detecting when a frequency of a detection signal is synchronized with a predetermined frequency which permits reproduction of said data signal, said detection signal being outputted when the data signal is detected from said detecting means; shift detecting means for detecting when a frequency of said detection signal outputted by said detecting means is shifted at least predetermined value from said predetermined frequency; braking means for braking said disk driving means to decrease the speed of rotation of said disk; time detecting means for operating said braking means after said synchronization detecting means detects the synchronization of said detection signal, and for detecting a period of time which lapses from the time instant said braking means is operated until said detecting means detects when said frequency of said detection signal is shifted at least said predetermined value from said predetermined frequency; determining means for determining a diameter of said disk from said period of time detected by said time detecting means.

In the display device of the invention, the motor is braked after the synchronization of the disk is established, and the time is detected which lapses until the synchronization is shifted a predetermined value, and the diameter of the disk is read from the time thus detected. That is, in the disk player, the time detecting operation is carried out after the rotation of the disk has been stabilized; in other words, the above-described time is detected stably and positively, which makes it possible to identify the loaded disk with high accuracy.

DETAILED DESCRIPTION OF THE PREFERRED EMBODIMENT

Figure 1:
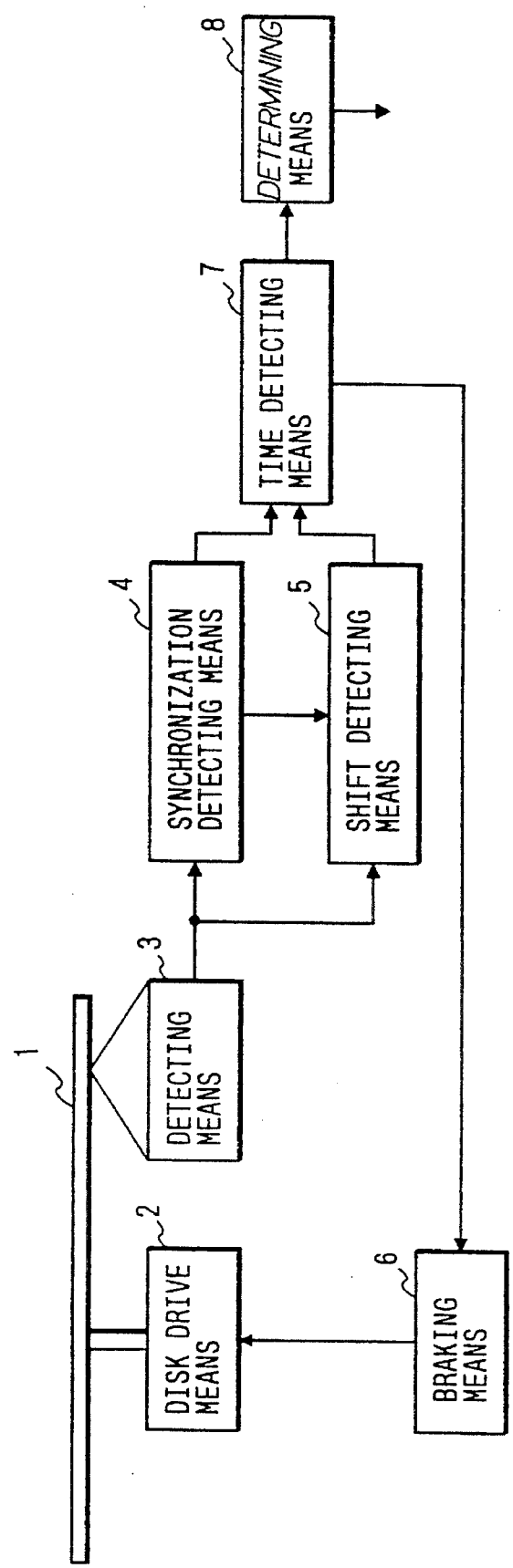
FIG. 1 is a diagram for a description of the principle of this invention.

FIG. 1 is a diagram for a description of the principle of this invention. A disk player according to the invention, as shown in FIG. 1, comprises: disk driving means 2; detecting means 3; synchronization detecting means 4; shift detecting means 5; braking means 6; time detecting means 7; and determining means 8.

The disk driving means 2 operates to rotate a plurality of disks different in diameter in which data signals have been stored in one and the same format. The detecting means 3 operates to read data signals from the disk loaded in the device.

The synchronization detecting means 4 operates to detect when the frequency of a detecting signal which the detecting means 3 outputs upon detection of data signals from the disk is synchronous with a predetermined frequency which permits reproduction of the data signals.

The shift detecting means 5 operates to detect when the frequency of the detection signal outputted by the detecting means 3 is shifted at least a predetermined value from the predetermined frequency.

The braking means 6 operates to brake the disk driving means 2 to decrease the speed of rotation of the disk.

The time detecting means 7 causes the braking means 6 to operate after the synchronization detecting means 4 has detected the synchronization, and detects a period of time which lapses from the time instant the braking means 6 is operated until the shift detecting means 5 detects the above-described frequency shift.

The determining means 8 operates to determine the diameter of the loaded disk from the period of time detected by the time detecting means 7.

Figure 2:
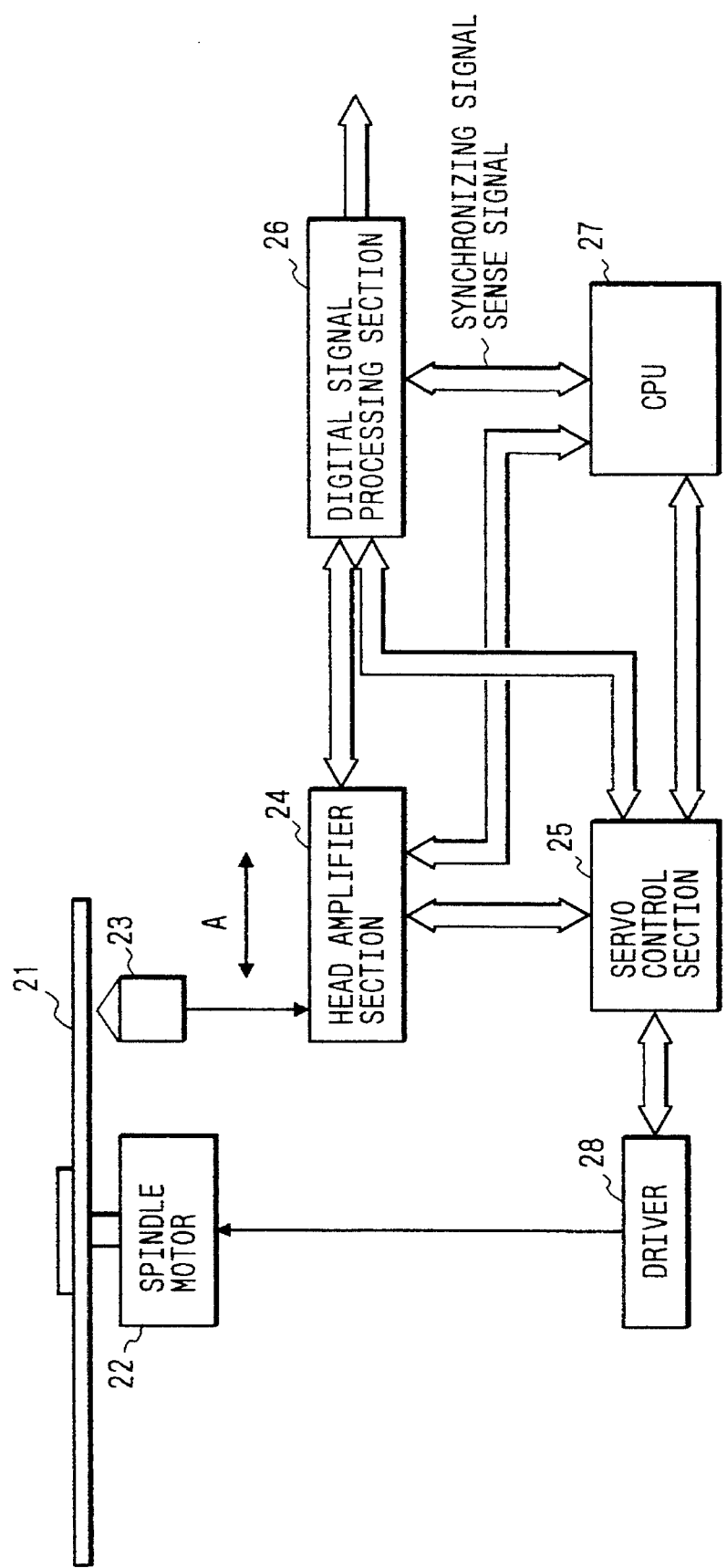
FIG. 2 is a block diagram showing the arrangement of a disk player, which constitutes one embodiment of the invention.

FIG. 2 is a block diagram showing the arrangement of a disk player, which constitutes one embodiment of the invention. In FIG. 2, reference numeral 21 designates a compact disk (CD) (corresponding to the disk 1 in FIG. 1). The central portion of the compact disk 21 is held through a clamping mechanism by a spindle motor 22 (corresponding to the driving means 2 in FIG. 1) so that the compact disk 21 is rotated by the latter 22.

A number of pits are spirally formed in the compact disk 21. A laser pickup 23 (corresponding to the detecting means 3 in FIG. 1) optically scans the pits to read a variety of data from the compact disk. The laser pickup 23 is so designed that it is movable in the directions of the arrow A (Namely, radially of the compact disk 21), and optically scans the pits as the compact disk 21 rotates.

A detection signal outputted by the laser pickup 23 is applied to a head amplifier section 24, where it is amplified and shaped. The output signal of the head amplifier section 24 is applied to a servo control section 25 and a digital signal processing section 26.

The signal processing section 26 includes the synchronization detecting-means 4 and the shift detecting means 5 which have been described with reference to FIG. 1. The signal processing section 26 processes the output signal of the head amplifier section 24 in a digital mode and applies the output signal thus processed to external circuits. The section 26 further operates to form monitor signals such as a synchronization signal and a sense signal, and apply them to a CPU 27. The CPU 27 includes the time detecting means 7 and the determining means 8 which have been described with reference to FIG. 1.

Figure 3:
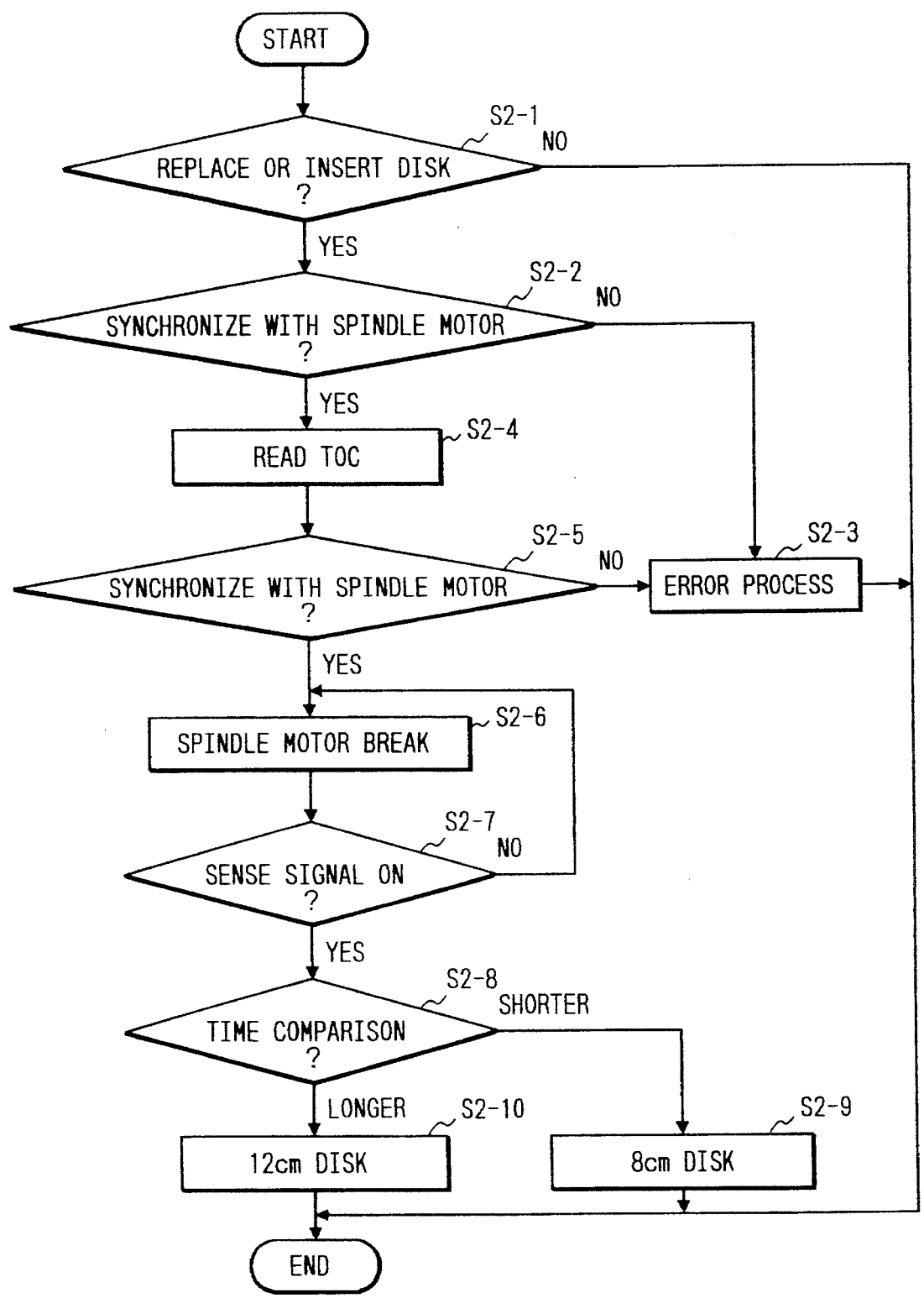
FIGS. 3 and 4A–4D are a flow chart and waveform diagrams, respectively, for a description of the operation of the disk player shown in FIG. 2.

Now, a disk identifying operation will be described with reference to FIGS. 3 and 4.

When the CPU 27 detects the replacement of the disk 21 with another one or the loading of a disk, the disk identifying operation is started (Step S2-1).

When the disk has been loaded in the device, the CPU 27 issues an instruction signal to rotate the spindle motor 22. Thus, the disk 21 is rotated by the spindle motor 22.

Upon rotation of the disk 21, the laser pickup 23 starts detection of data from the disk 21. On the other hand, the CPU 27 detects the state of synchronization of the disk 21 from the synchronization signal which the digital signal processing section 26 forms for indication of the synchronization of the disk 21 (Step S2-2). When the synchronization is not obtained, it is determined that the disk loaded is different in format, and an error process is carried out, for instance, to display the fact that the disk loaded is different in format (Step S2-3).

In the case when the synchronization is obtained, index data called "TOC (table of contents) data" is read from the disk 21 (Step S2-4). Thereafter, the CPU 27 confirms the state of synchronization of the disk 21. When the synchronization of the disk is not established, the CPU 27 performs the error process; whereas when the synchronization of the disk 21 is established, the CPU applies an instruction signal to brake the spindle motor 22 (Steps S2-5, and S2-6).

Figure 4:
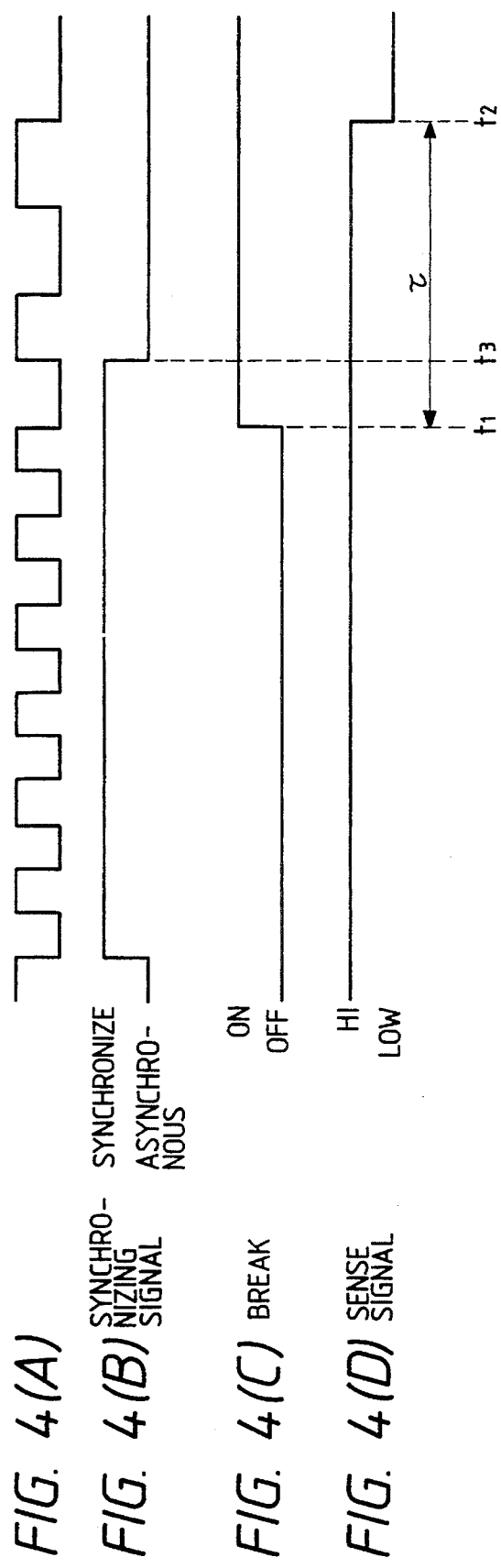
Figure 5:
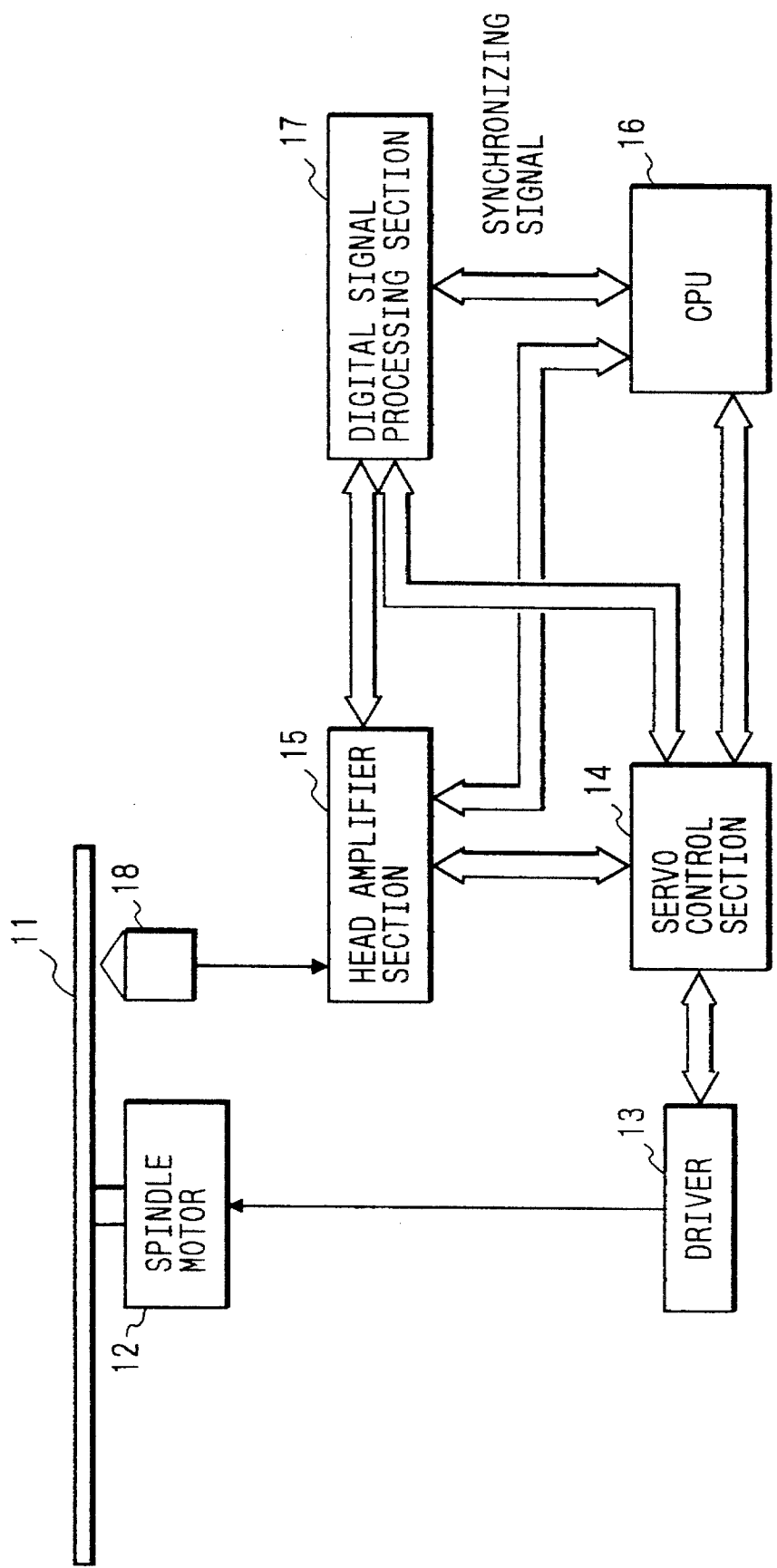
FIG. 5 is a block diagram showing the arrangement of one example of a conventional disk player.
Figure 6:
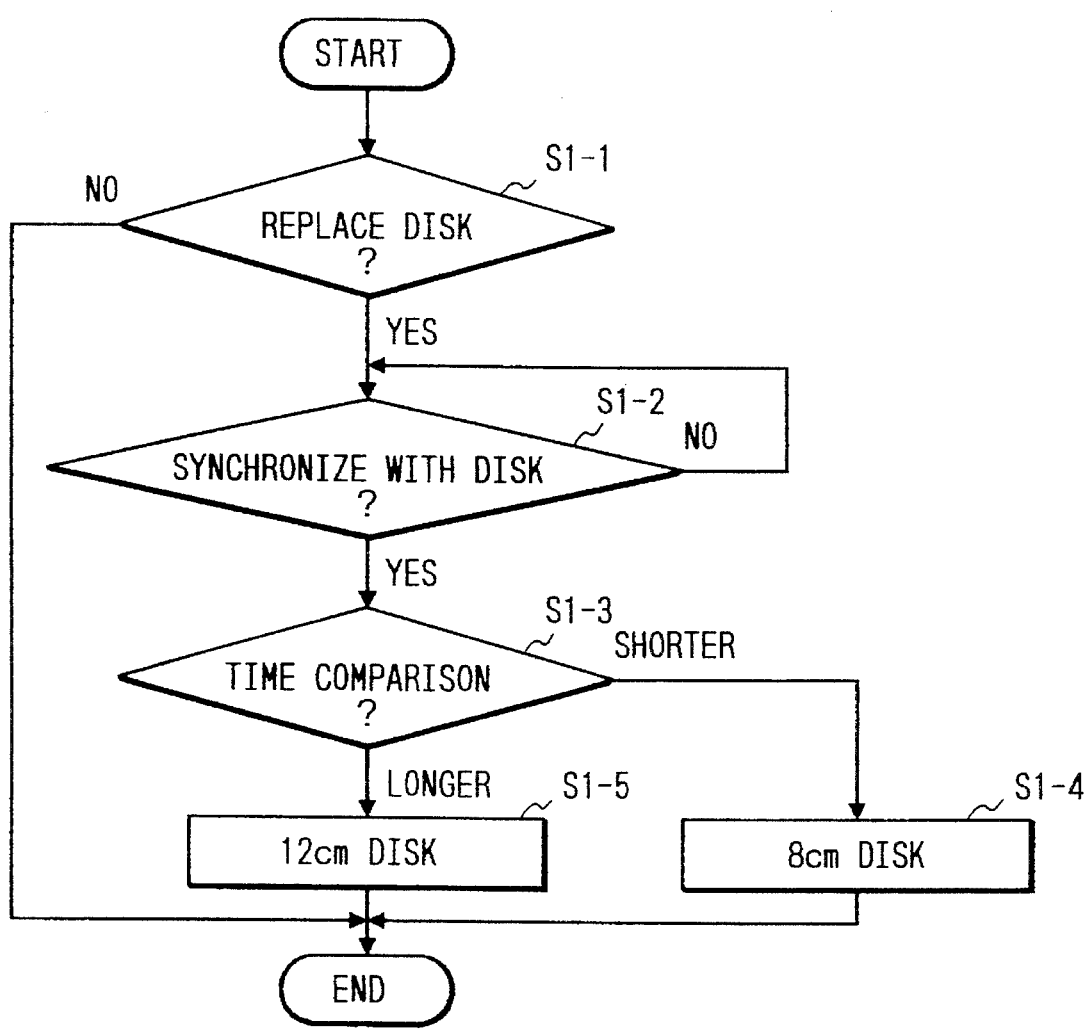
FIG. 6 is a flow chart for a description of the operation of the conventional disk player.

When the spindle motor 22 is braked at the time instant $t_1$ (the part (C) of FIG. 4), the synchronization of the disk 21 is stepped out at the time instant $t_3$ (the part (B) of FIG. 4). When the synchronization is stepped out by a predetermined value or more, the sense signal outputted by the digital signal processing section 26 is set to low level as indicated in the part (D) of FIG. 4. In response to this sense signal, the CPU 27 detects a period of time r which lapses from the time instant $t_1$ the braking instruction is issued until the sense signal is set to low level (Step S2-7). The CPU 27 compares the period of time thus detected with a reference value stored in advance (Step S2-8).

In the case where the period of time thus detected is shorter than the reference value, the CPU 27 determines it from the fact that the braking effect is high with the disk small in inertia that the disk 21 loaded is an 8 cm compact disk which is small in inertia. On the other hand, in the case where the period of time thus detected is longer than the reference value, the CPU 27 determines it from the fact that the braking effect is low with the disk large in inertia that the disk 21 loaded is a 12 cm compact disk which is large in inertia.

When it is determined that the disk loaded is an 8 cm compact disk or a 12 cm compact disk, the CPU 27 applies a gain control signal to the servo control section 25 to change the control gain of the motor 22 to a value suitable for the diameter of the compact disk thus determined. In addition, the result of disk determination can be used not only for changing the control gain of the motor 22 but also for controlling other functions.

As was described above, in the device of the invention, the disk loaded is identified after its synchronization has been established. Hence, the time detecting operation is carried out with the rotation of the disk stabilized; that is, it can be achieved with high accuracy. Thus, the device of the invention is advantageous in that the disk loaded can be identified with high accuracy.

What is claimed is:

1. A disk player comprising:

disk driving means for driving a disk; detecting means for reading a data signal from said disk;

synchronization detecting means for detecting when a frequency of a detection signal is synchronized with a predetermined frequency which permits reproduction of said data signal, said detection signal being outputted when the data signal is detected from said detecting means;

shift detecting means for detecting when a frequency of said detection signal outputted by said detecting means is shifted at least predetermined value from said predetermined frequency;

braking means for braking said disk driving means to decrease the speed of rotation of said disk;

time detecting means for operating said braking means after said synchronization detecting means detects the synchronization of said detection signal, and for detecting a period of time which lapses from the time instant said braking means is operated until said detecting means detects when said frequency of said detection signal is shifted at least said predetermined value from said predetermined frequency;

determining means for determining a diameter of said disk from said period of time detected by said time detecting means.

2. A disk player as claimed in claim 1, wherein said disk player contains a plurality of disks in which said data signals have been stored in one and the same format.

3. A disk player as claimed in claim 1, wherein said disk player contains a 12 cm. disk and a 8 cm. disk.

4. A disk player as claimed in claim 1, wherein said shift detecting means changes a sense signal when a frequency of said detection signal outputted by said detecting means is shifted at least a predetermined value from said predetermined frequency.

5. A disk player comprising:

disk driving means for driving a disk;

detecting means for reading a data signal from said disk;

synchronization detecting means for detecting when a frequency of a detection signal is synchronized with a predetermined frequency which permits reproduction of said data signal, said detection signal being outputted when the data signal is detected from said detecting means;

shift detecting means for detecting when a frequency of said detection signal outputted by said detecting means is shifted at least a predetermined value from said predetermined frequency to change a sense signal;

braking means for braking said disk driving means to decrease the speed of rotation of said disk;

time detecting means for operating said braking means after said synchronization detecting means detects the synchronization of said detection signal, and for detecting a period of time which lapses from the time instant said braking means is operated until said shift detecting means changes said sense signal; and determining means for determining a diameter of said disk from said period of time detected by said time detecting means.

6. A method for determining a diameter of a disk comprising steps of:

driving said disk;

reading a data signal from said disk;

detecting when a frequency of a detection signal is synchronized with a predetermined frequency which permits reproduction of said data signal, said detection signal being outputted when the data signal is detected;

braking said disk driving to decrease the speed of rotation of said disk after said detecting detects the synchronization of said detection signal;

detecting a period of time which lapses from the time instant said braking is operated until when said frequency of said detection signal is shifted at least a predetermined value from said predetermined frequency; and determining a diameter of said disk from said period of time detected by said detecting.

* * * * *